United States Patent [19]
Inaga

[11] 3,934,344
[45] Jan. 27, 1976

[54] PORTABLE CHAIN SAW
[75] Inventor: Hisashi Inaga, Tokyo, Japan
[73] Assignee: Kioritz Corporation, Tokyo, Japan
[22] Filed: Oct. 7, 1974
[21] Appl. No.: 512,903

[30] Foreign Application Priority Data
Mar. 28, 1974 Japan.............................. 49-33953

[52] U.S. Cl. .............................................. 30/381
[51] Int. Cl.² .................... B23D 57/02; B27B 17/00
[58] Field of Search......................... 30/381; 173/162

[56] References Cited
UNITED STATES PATENTS

| | | | |
|---|---|---|---|
| 3,525,373 | 8/1970 | Kobayashi et al. | 173/162 |
| 3,542,095 | 11/1970 | Frederickson et al. | 30/381 |
| 3,637,029 | 1/1972 | Sherwood et al. | 173/162 |
| 3,652,074 | 3/1972 | Frederickson et al. | 173/162 |
| 3,698,455 | 10/1972 | Frederickson et al. | 30/381 |
| 3,700,015 | 10/1972 | Kobayashi et al. | 173/162 |

*Primary Examiner*—James L. Jones, Jr.
*Attorney, Agent, or Firm*—Karl W. Flocks

[57] ABSTRACT

A chain saw adapted to damp mechanical vibrations comprising a front handle attached to the front portion of the engine section through a plurality of vibration dampers made of rubber or like material, a connector made of a rigid material connected to the front handle and disposed downwardly of the engine section to extend rearwardly thereof, and a rear handle attached to the upper portion of the rear wall of the engine section through at least one vibration damper made of rubber or like material. The connector is connected at its rear end portion to the rear handle through a vibration damper made of rubber or like material and at its intermediate portion to the underside of the engine section through a vibration damper made of rubber or like material.

5 Claims, 13 Drawing Figures

PORTABLE CHAIN SAW

BACKGROUND OF THE INVENTION

This invention relates to the construction in which handles for operating a portable chain saw or other portable machine which has a built-in vibration producing source are mounted such that vibrations produced by the vibration producing source (hereinafter referred to as the engine) is absorbed through vibration absorbing means.

Generally, a fuel tank, an oil tank, a chain saw blade actuating section and the engine for driving the saw blade constitute a main body of a sawing machine of this type in order to obtain an overall compact size. Usually, the sawing machine of this type has attached thereto through vibration absorbing means a rear handle for deciding the direction of movement of the chain saw blade and a front handle for supporting the main body when a sawing operation is performed.

The rear handle is intended to perform the function of maintaining the chain saw blade in a predetermined position, in a predetermined posture and in a predetermined direction when a sawing operation is performed, so that the rear handle has only to be gripped with a force of relatively low intensity. On the other hand, the front handle is disposed near the center of gravity of the main body of a chain saw and mainly intended to support the weight of the main body. Thus, the front handle must be mounted such that it can readily cope with a change in the posture of the main body and at the same time satisfactorily absorb vibration of the main body.

In view of the aforementioned functions of the handles, several types of chain saws including handles constructed to absorb vibration have hitherto been developed. However, none of them have been satisfactory in operation.

SUMMARY OF THE INVENTION

Generally, the use of vibration absorbing means interposed between the main body and handles tends to increase flexibility in the connection between the main body and each handle as the ability of the vibration absorbing means increases, with a result that the degree of precision with which the sawing machine is operated is lowered and difficulty is experienced in performing a sawing operation. Accordingly, this invention has as its object the provision of a portable chain saw and more particularly an improved construction of vibration absorbing means for the handles of a chain saw which enables the chain saw to be gripped and operated with increased efficiency. The construction provided by the invention enables the handles of the chain saw to have required rigidity without losing their vibration absorbing capabilities. With the construction provided by the invention, a sawing operation can be performed positively and readily by absorbing shock to which the body of the operator would otherwise be exposed, so that the safety of the operator can be ensured.

Additional and other objects and features of the invention will become evident from the description set forth hereinafter when considered in conjunction with the accompanying drawings.

DESCRIPTION OF PREFERRED EMBODIMENTS

Figure 1:
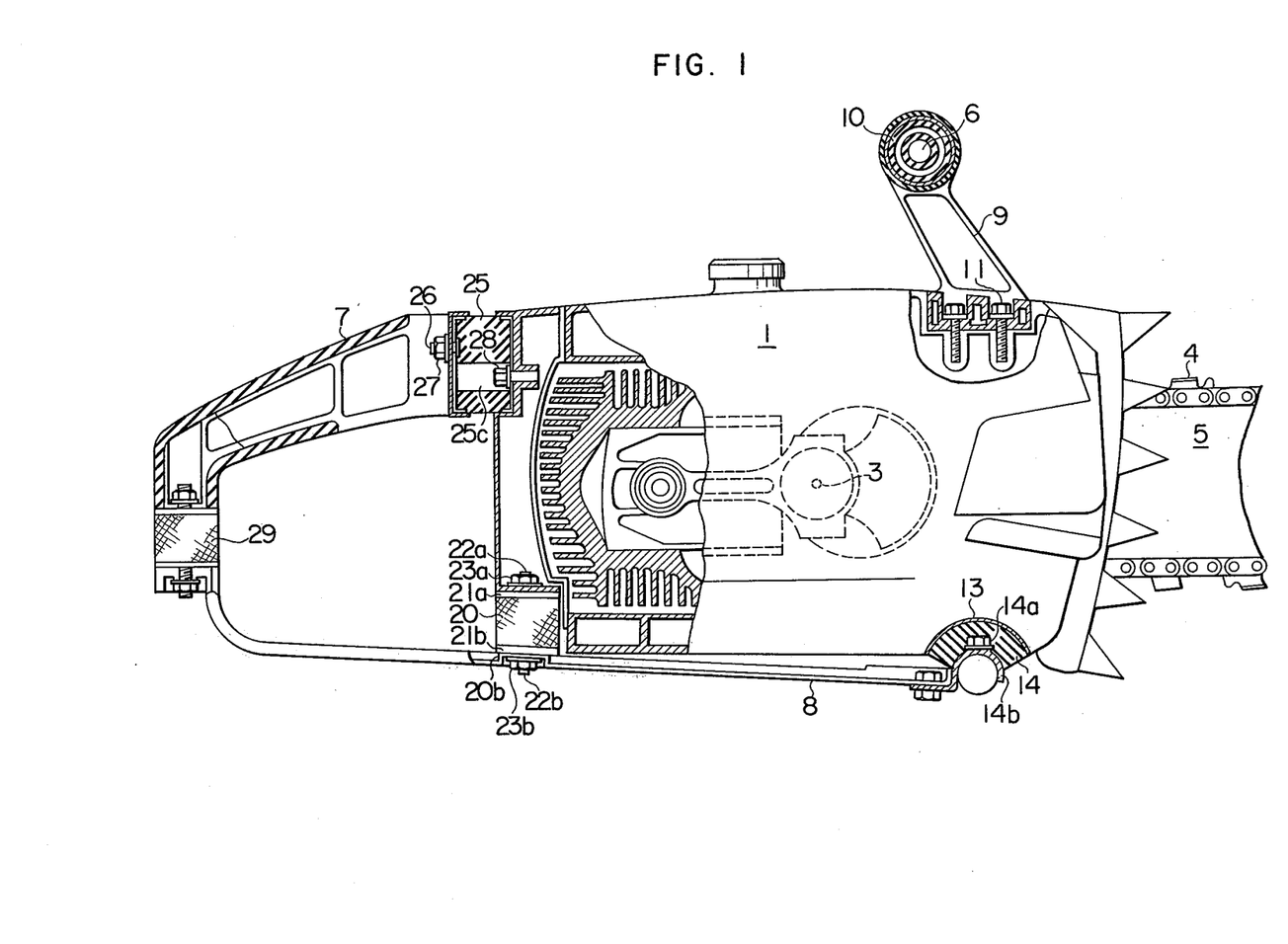
FIG. 1 is a side view, with certain parts being shown in section, of the chain saw comprising one embodiment of the invention.

A first embodiment of the invention will be described with reference to FIG. 1 to FIG. 5. An engine and a device associated therewith necessary for driving a chain saw blade 4 is housed in a main body 1 of the engine of the chain saw. The chain saw blade 4 which is driven through a drive shaft moves on an endless track along the edges of a guide plate 5 extending rightwardly in FIG. 1 and performs a sawing action by its teeth. In FIG. 1, 3 designates the center axis of the drive shaft.

The main body 1 has a front handle 6 and a rear handle 7 attached thereto, so that the operator can positively hold the main body 1 of the chain saw by gripping these handles to manually operate the saw. The front handle 6 is mounted such that it surrounds the top, one side and bottom of a front portion of the main body 1 and is connected at the bottom of the main body 1 to a T-shaped connector 8 made of a rigid material. The connector 8 extends rearwardly from the front portion of the main body 1 and is connected at its rear end portion to the rear handle 7 through a vibration absorber 29. The connector 8 is secured at its intermediate portion 20b to the main body 1 through a vibration absorber 20. Thus, the front handle 6 is connected to the rear handle 7 through the connector 8. By this arrangement, the swinging motion of the main body 1 relative to the front handle 6 in a plane normal to the handle 6 can be precluded while a sawing operation is being performed.

The front handle 6 is firmly secured at its upper end to a support post 9 which is rigidly connected to the main body 1 by a bolt 11. An upper vibration absorber 10 is interposed between the front handle 6 and the support post 9. The front handle 6 surrounding the main body 1 at three sides is spaced apart therefrom a distance sufficiently great to permit the hand of the operator to grip the handle 6. On the other hand, the front handle 6 is secured at its lower end to the main body 1 through a lower vibration absorber 14 arranged in a lower seat 13 which extends in the form of a rectangle along the center axis 3 of the drive shaft. The connector 8 which extends rearwardly is secured at its intermediate portion 20b to the bottom of the main body 1 through a vibration absorber 20 in a position which is near the rear end of the main body 1. The connector 8 is further connected at its rear end to the lower end of the rear handle 7 through a vibration absorber 29. The rear handle 7 is secured to the upper portion of the rear wall of the main body 1 through a plurality of vibration absorbers 25.

Figure 2:
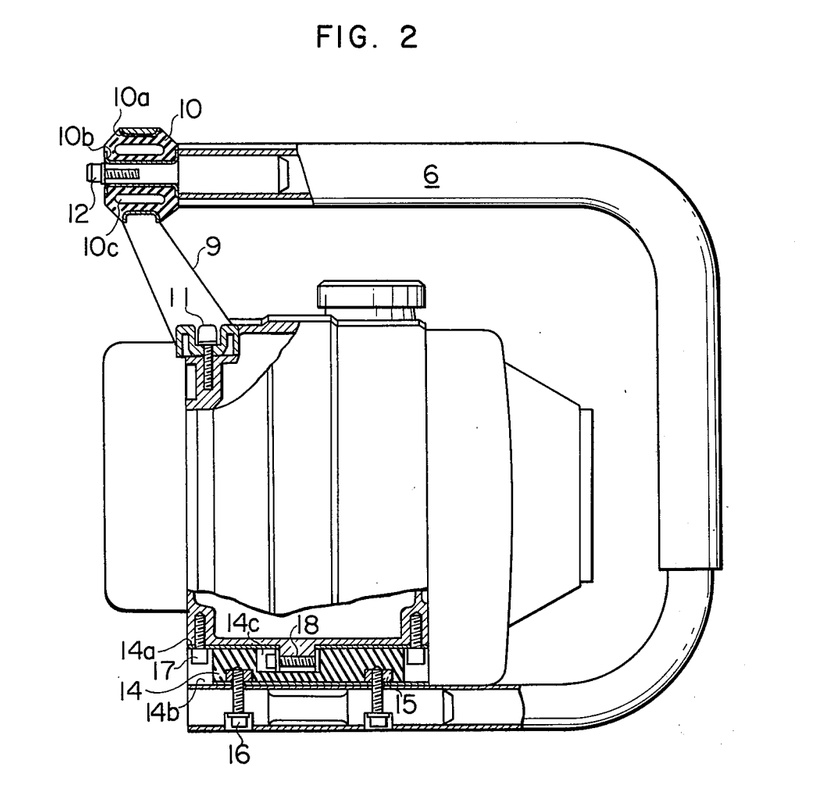
FIG. 2 is an end view, with certain parts being shown in section, of the front handle showing the manner in which it is attached to the chain saw of FIG. 1.

As shown in FIG. 2, the upper vibration absorber or shock absorber 10 for the front handle 6 consists of a pair of left and right halves of a resilient member made as of vibration absorbing rubber, and annular plate members 10a and 10b made of a rigid material and secured to outer periphery and inner periphery respectively of the resilient member. The annular plate member 10a is inserted in an annular end portion of the support post 9, while the annular plate member 10b receives therein a minor diameter portion of the front handle 6. The upper shock absorber 10 is thus positively secured to the front handle 6 and the post 9 by a mounting bolt 12. 10c is an annular hollow portion which is formed when the two halves of the upper shock absorbing means 10 are assembled.

Like the upper shock absorber 10, the lower vibration absorber or shock absorber 14 consists of a resilient member made as of vibration absorbing rubber and upper and lower rigid plate members 14a and 14b affixed to the upper and lower sides of the resilient member respectively. The lower shock absorber 14 is substantially segmental in shape in its transverse cross-section as shown in FIG. 1 and substantially rectangular in shape in its longitudinal cross-section as shown in FIG. 2 to extend longitudinally along one side of the main body 1. Mounting nuts 15 are secured to one side of the lower plate member 14b which is in contact with and embedded in the resilient member. By threadably connecting mounting bolts 16 on the mounting nuts 15, it is possible to positively affix the lower shock absorber 14 to the lower end of the front handle 6. On the other hand, the upper plate member 14a is secured at opposite ends of its longitudinal axis by mounting bolts 17 to the bottom of the main body 1. 14c is a recess formed in the resilient member to receive therein bolts 18 for interconnecting housing members for the main body 1.

The vibration absorber or shock absorber 20 through which the intermediate portion of the connector 8 is secured to the bottom of the main body 1 consists of a cylindrical resilient member made as of rubber, and plate members 21a and 21b affixed to the upper surface and underside of the resilient member as shown in FIG. 1. Threaded rods 22a and 22b extend outwardly from end surfaces of the plate members 21a and 21b respectively. By threadably connecting nuts 23a and 23b to the threaded rods 22a and 22b respectively and tightening them, it is possible to firmly secure the intermediate portion 20b of the connector 8 to the rear wall of the main body 1.

The front handle 6 is supported at its upper end portion by the upper portion of the main body 1 through the front shock absorber 10 of the aforesaid construction, and at its lower end portion by the front end of the lower portion of the main body 1 at a pressure bearing seat of a substantial width extending laterally. Thus, the front handle 6 is supported, as it were at three points. Moreover, the main body 1 is supported at the lower portion of its rear wall by the connector 8 firmly secured to the shock absorber through the bolts 16. This makes it possible to support the sawing machine in a stable manner when a sawing operation is performed. Furthermore, the connector 8 extends rearwardly of the main body 1 and is connected at its rear end to the rear handle 7, thereby ensuring positive handling of the main body 1 during operation.

When the sawing machine is handled, the front handle 6 is responsible for movement and support of the sawing machine during its operation, because the front handle 6 is disposed in a position disposed in the vicinity of the vertical and transverse planes passing through the center of gravity of the machine. Thus, by virtue of the aforementioned arrangement, the swinging motion of the sawing machine in a vertical direction relative to the front handle 6 is restricted by the connector 8 disposed below the main body 1, while the swinging motion of the machine in a transverse direction (leftwardly and rightwardly) is restricted by the provision of the lower shock absorber 14 which has a pressure supporting seat extending transversely for a substantial distance. Thus, the machine can be held firmly when it is supported by the operator gripping the front handle 6, because the front handle 6 has suitable rigidity as aforementioned.

Figure 3:
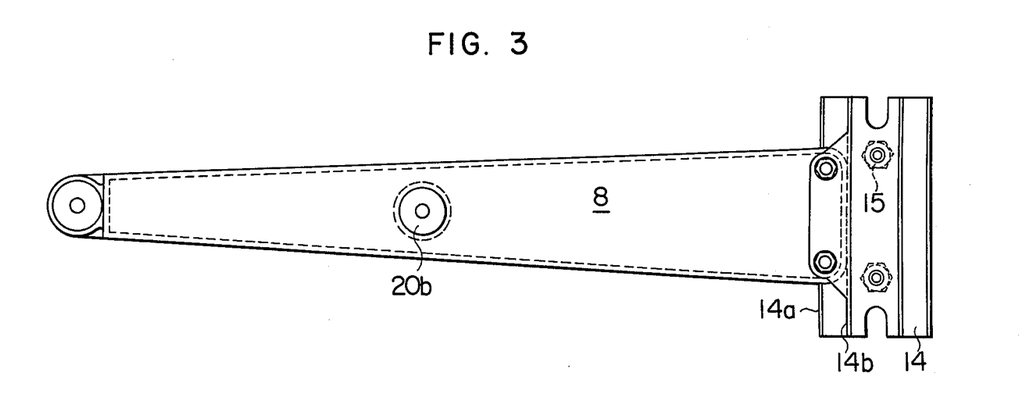
FIG. 3 is a front view of the connector used in the chain saw shown in FIG. 1.

The connector 8 is substantially in the form of a letter T as shown in FIG. 3. It is to be understood, however, that the invention is not limited to this form of connector and that the connector 8 may be of any form as desired.

On the other hand, the rear handle 7 is affixed at its front end portion to a shock absorber seat disposed on the upper portion of the rear wall or back surface of the main body 1 through a plurality of shock absorbers 25 (two in number in this embodiment) spaced apart from each other in a direction parallel to the center axis of the drive shaft and secured to the rear handle 7. The rear handle 7 is connected at its rear end through a cylindrical shock absorber 29 to the rear end portion of the connector 8. Thus the rear handle 7 and the connector 8 are interconnected to be shaped in the form of a letter U lying on one side and its open upper portion facing toward and disposed at right angles to the front handle 6. The rear handle 7 mainly performs the function of deciding the direction in which the machine faces.

The upper shock absorbers 25 for the rear handle 8 are similar in construction to the shock absorber for the front handle 6 and consists of a resilient member made as of rubber, and plate members 25a and 25b made of a rigid material and affixed to opposite end surfaces of the resilient member. Formed within the resilient member is a hole 25c (See FIG. 1) in which are arranged mounting bolts 28 connected through the plate member 24a to the rear wall of the main body 1 and fastened thereto. Mounting bolts 27 are connected to the plate member 25b and nuts 37 are in threadable engagement with the bolts 26. By tightening the nuts 27 on the bolts 27, the rear handle 7 can be firmly secured to the main body 1.

The cylindrical shock absorber 29 for connecting the rear handle 7 to the connector 8 is similar in construction to the shock absorber 20 for securing the connector 8 at its intermediate portion to the bottom of the main body 1. By tightening nuts on threaded mounting rods, it is possible to connect the rear handle 7 to the connector 8.

A second embodiment of the invention will now be described with reference to FIg. 6 to FIG. 10. The second embodiment is similar in construction to the first embodiment shown and described above except for the fact that they are distinguished from each other in the construction of the lower shock absorber for the front handle and the upper shock absorber for the rear handle 7. In the drawings, therefore, like reference characters designates similar parts.

Figure 7:
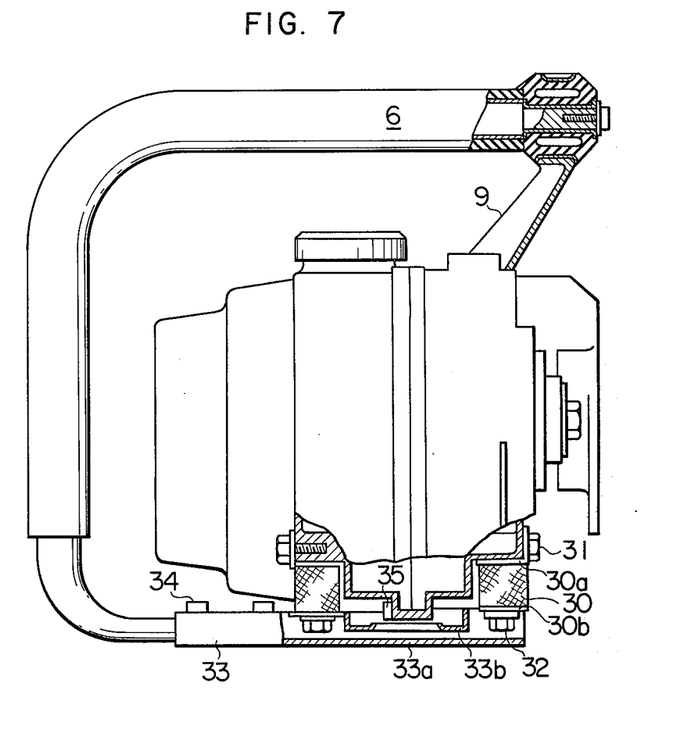
FIG. 7 is an end view, with certain parts being shown in section, of the front handle shown in FIG. 6 showing the manner in which the front handle is attached to the chain saw.
Figure 8:
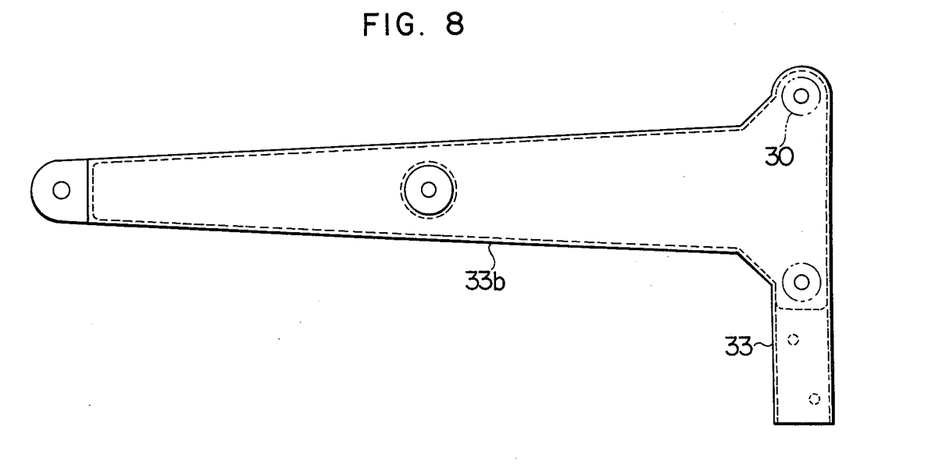
FIG. 8 is a front view of the connector used in the chain saw shown in FIG. 6.

The numeral 30 designates lower shock absorbers for the front handle 6 mounted in two positions as shown in FIG. 7 and spaced apart from each other in a direction parallel to the center axis 3 of the drive shaft. The numeral 33 designates a connector secured by mounting bolts 34 to the lower end portion of the front handle 6. Being substantially in the form of a letter T as shown in FIG. 8, the connector 33 comprises a portion 33a connected to the end of the front handle 6 and extending transversely of the machine, and a portion 33b disposed at right angles to the longitudinal axis of the portion 33a or extending lengthwise of the machine. The shock absorbers 30 which are rectangular in cross-section each consists of a resilient member and plate members 30a and 30b attached to opposite end surfaces of the resilient member, and secured to the main body 1 and connector 33 through mounting bolts 31 and 32 respectively. 35 designates bolts for interconnecting housing members for the main body 1.

Figure 4:
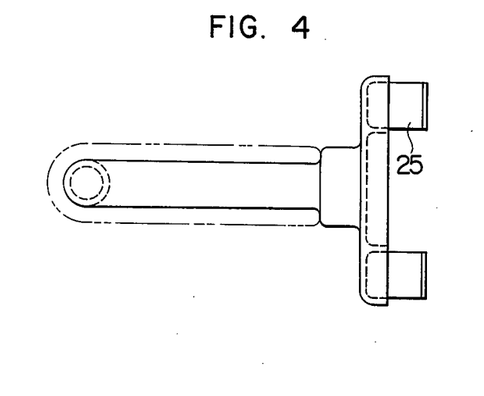
FIG. 4 is a top plan view of the rear handle attached to the chain saw shown in FIG. 1.
Figure 5:
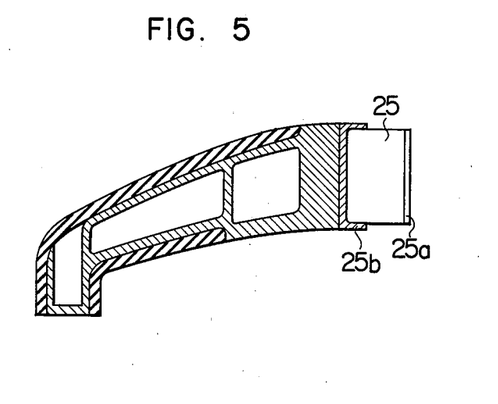
FIG. 5 is a sectional side view of the rear handle shown in FIG. 4.
Figure 6:
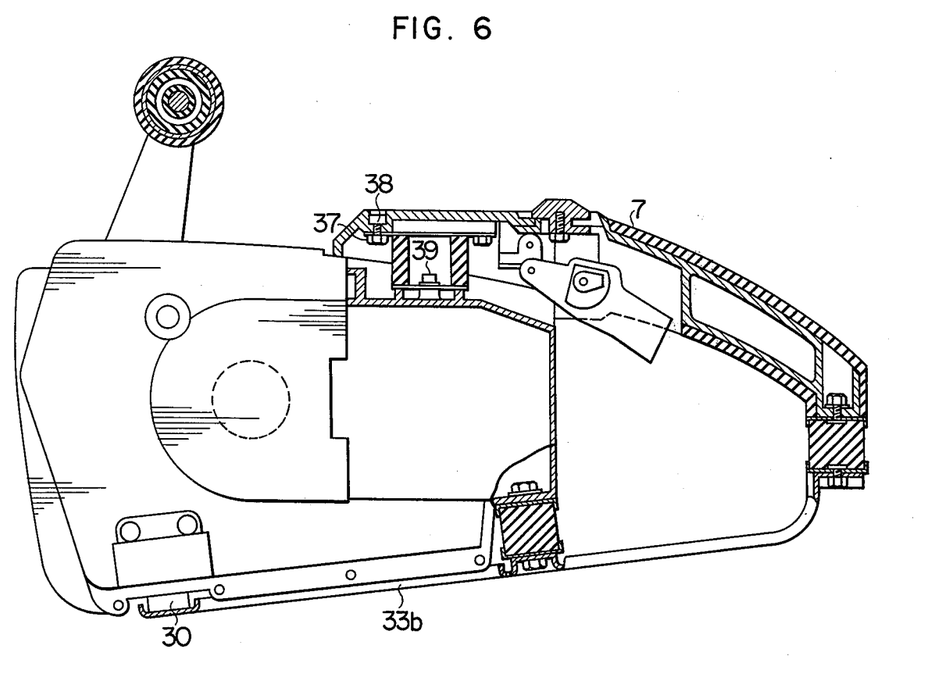
FIG. 6 is a side view, with certain parts being shown in section, of the chain saw comprising another embodiment of the invention.
Figure 9:
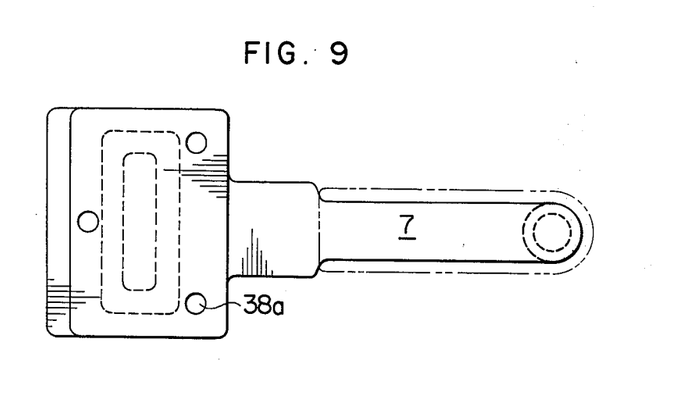
FIG. 9 is a top plan view of the rear handle attached to the chain saw shown in FIG. 6.
Figure 10:
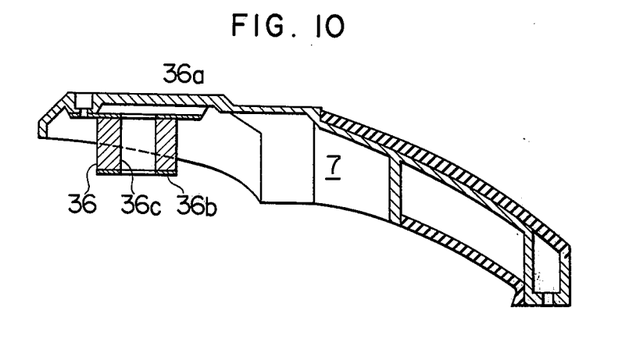
FIG. 10 is a sectional side view of the rear handle shown in FIG. 9.

The rear handle 7 shown in FIG. 9 and FIG. 10 is similar to the rear handle shown in FIG. 4 and FIG. 5 but distinguished therefrom in that a plurality of shock absorbers are provided and arranged in transversely spaced relation in the first embodiment while the shock absorber of the second embodiment designated 36 is rectangular in shape with its longitudinal axis extending transversely of the machine. The shock absorber 36 consists of a resilient member which may be hollow and formed with a bore 36c therein, so that the resilient member is annular in shape. This enables to economize on material and to effect control of the resilience of the shock absorbing means.

The shock absorber 36 also consists of plate members 36a and 36b affixed to upper and lower surfaces of the resilient member respectively. The shock absorber 36 is secured to the rear handle 7 by threadably connecting mounting bolts 38 to nuts 37 disposed in bolt receiving openings 38a at the back of outwardly extending portions of the upper plate member 36a, and to the upper wall of the rear portion of the main body 1 through a mounting bolt 39.

The shock absorber for the rear handle 7 shown in FIG. 9 and FIG. 10 is slightly distinguished in construction from the shock absorber for the rear handle 7 shown in FIG. 4 and FIG. 5. However, they are both connected at one point to the rear end of the connector and at a plurality of points in the mounting seat of the main body 1. Thus, the rear handle is, as it were, supported at three points. Thus, the rear handle 7 can remain rigid to a suitable degree with respect to the main body 1. In the two embodiments, different types of shock absorbers may be used for the different positions. For example, the lower shock absorber or absorbers for the front handle may be used for the rear handle and the upper shock absorber or absorbers for the rear handle may be used for the front handle.

Figure 11:
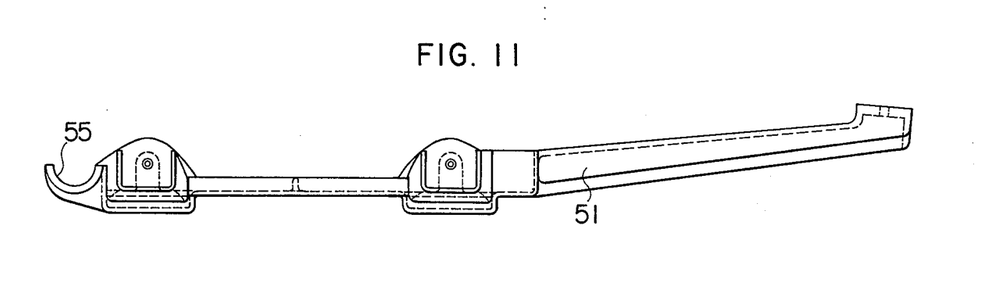
FIG. 11 shows a front view of a further modification of the connector forming a third embodiment of the invention.
Figure 12:
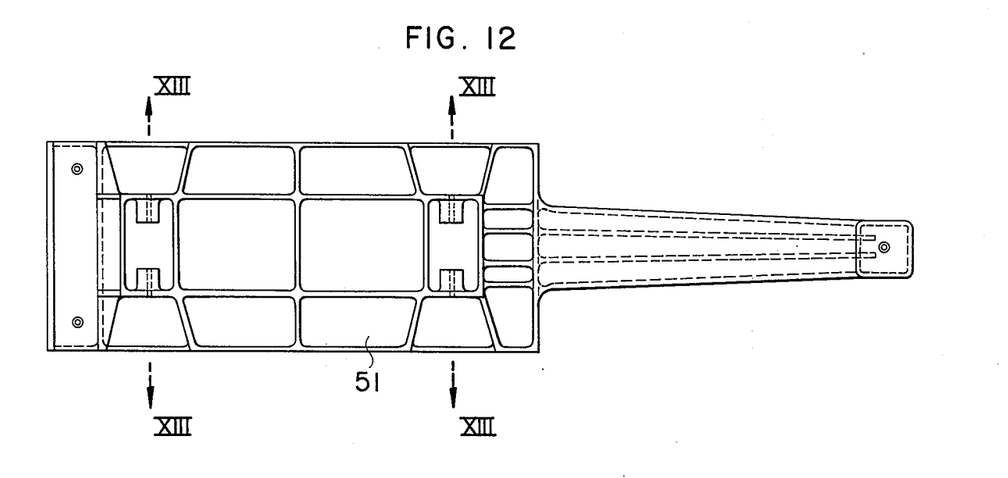
FIG. 12 is a top plan view of the connector of FIG. 11.
Figure 13:
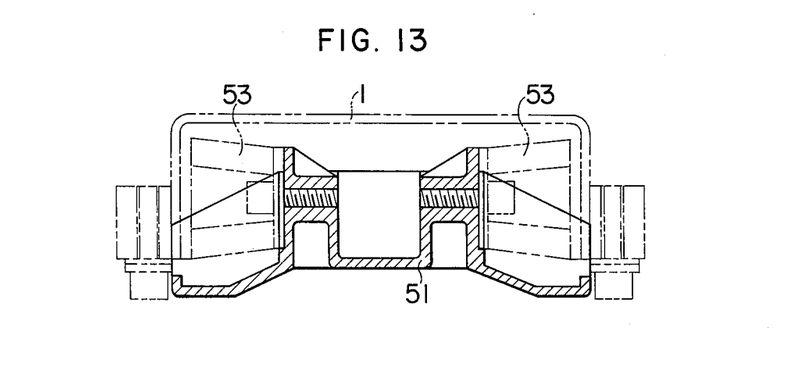
FIG. 13 is a sectional view along lines XIII—XIII of FIG. 12.

Further, another modification of the connector 51 as shown in FIGS. 11 to 13 may be used in a chain saw of the third embodiment, wherein only the constructions for attaching the lower portion of said front handle and the intermediate portion of said connector to the main body of the chain saw engine are changed from the first and second embodiments.

This connector 51 is made of casted metal such as aluminum, and is connected at its front portion to the front area of said main body 1 of the chain saw engine through shock absorbing members 53 and at its intermediate portion to the rear bottom area of said main body through shock absorbing members 53 similar to the former, as shown in FIG. 13.

The rear portion of said connector is connected to the rear end of the rear handle 7 through a shock absorbing member substantially identical to the one 29 of the first embodiment shown in FIG. 1.

As seen from FIGS. 11 and 12, the connector 51 is provided with reinforcement ribs in a suitable arrangement and thus is made rigid unitaty construction. In this third embodiment, the front handle 6 is securely mounted on the seat portion (55) formed at the front end of said connector.

From the foregoing description, it will be appreciated that according to the invention the front handle and the rear handle are connected to each other so that they may function as an assembly of handles and they are secured as a unit to the main body through shock absorbing means. By this arrangement, vibrations caused to occur by the mechanical vibration source can be absorbed by the shock absorbers disposed at various portions of the assembly of the front and rear handles. Moreover, the front handle and rear handle can each support the main body of the sawing machine at three points. This enables the handles to be firmly secured to the main body with suitable rigidity and therefore precludes the swinging motion of the machine either vertically or transversely while the machine is being operated. Thus, the machine can be moved and held in position by means of the front handle, and can be made to face any direction as desired by means of the rear handle. The invention offers advantages in operating the sawing machine which have never been realized by support systems of the prior art, and contributes to improvements in shock absorbing devices for chain saws, so that the influences exerted by vibrations on the operator can be minimized and a sawing operation can be performed safely without causing any injury to the operator.

I claim:

1. A portable type chain saw having separate front and rear handles which are attached respectively to front and rear portions of the main body of the chain saw engine in a manner that mechanical vibration caused by the engine-operation may be absorbed characterized in that said front handle is attached to a front portion of the main body of the chain saw engine through vibration dampers of rubber or the like elastomeric material, said rear handle is attached to an upper rear wall of said main body through vibration dampers of rubber or the like elastomeric material; said front and rear handles are connected together by means of a rigid unitary connector extending longitudinally of said main body at the lower side thereof; said connector having a front end portion attached to a lower portion of said front handle, an intermediate portion attached to a lower rear portion of said main body through vibration damper of rubber or the like elastomeric material and a rear end portion extending rearwardly beyond said main body and attached to said rear handle through vibration damper of rubber or the like elastomeric material.

2. A portable type chain saw as defined in claim 1, wherein said front handle is attached through said vibration dampers to said main body of the chain saw engine at at least two positions substantially spaced apart from each other transversely of said chain saw, and said connector is rigidly attached to said front handle.

3. A portable type chain saw as defined in claim 1, wherein said front handle is connected to said main body of the chain saw engine through a vibration damper having a substantial width transversely of said chain saw, and said connector is rigidly attached to said front handle.

4. A portable type chain saw having separate front and rear handles which are attached respectively to the front and rear portions of the main body of the chain saw engine in a manner that mechanical vibration caused by the engine operation may be absorbed characterized in that said chain saw comprises a unitary rigid connector extending longitudinally of said main body at the lower side thereof so as to connect said front handle with said rear handle, said connector being attached at a forward portion thereof to a lower front section of said main body through vibration damper of rubber or the like elastomeric material, at an intermediate portion thereof to a lower rear section of said main body through vibration damper of rubber or the like elastomeric material and at a rear end portion thereof to a lower rear end portion of said rear handle through vibration damper of rubber or the like elastomeric material;

said front handle being attached to the front end portion of said connector, said rear handle being attached to the upper rear wall of said main body of the chain saw engine through vibration damper of rubber or the like elastomeric material.

5. A portable type chain saw as defined in claim 4, wherein the connection of said connector to the lower front section of said main body is made by means of at least two vibration dampers of rubber or the like elastomeric material which are substantially spaced with each other in transversely of the chain saw.

* * * * *